UNITED STATES PATENT OFFICE.

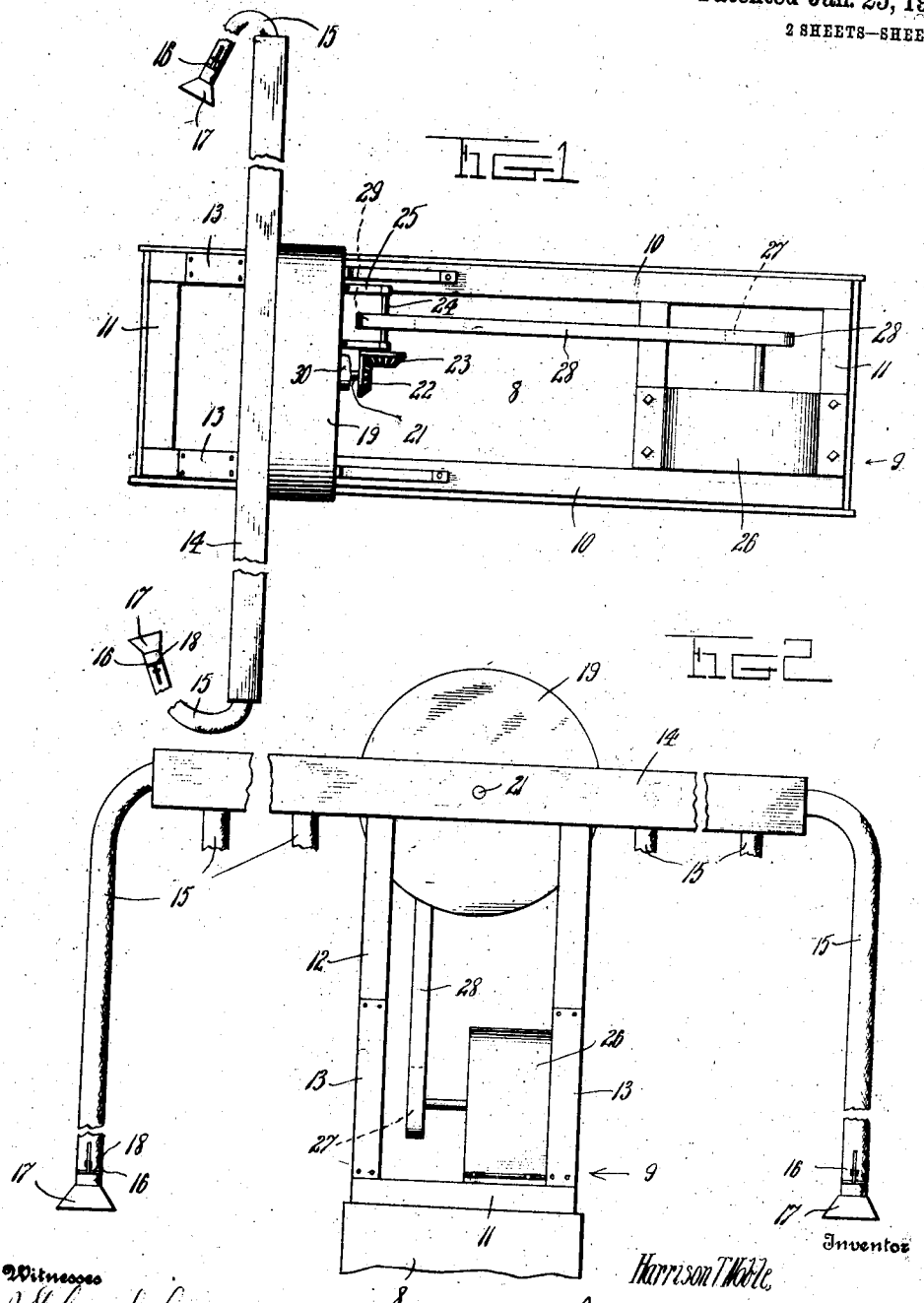

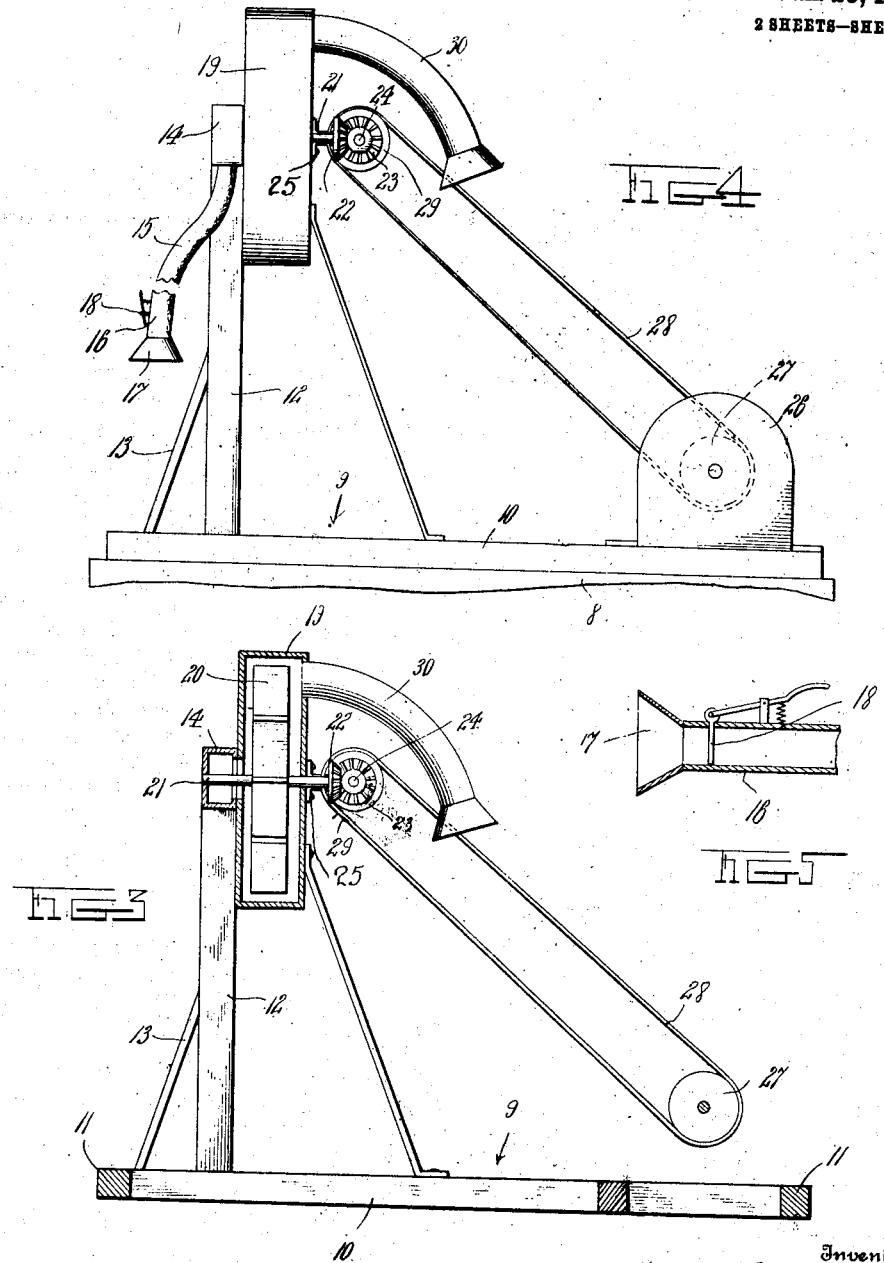

HARRISON T. NOBLE, OF TOGO, OKLAHOMA.

COTTON-PICKER.

947,559. Specification of Letters Patent. Patented Jan. 25, 1910.

Application filed September 21, 1908. Serial No. 453,895.

*To all whom it may concern:*

Be it known that I, HARRISON T. NOBLE, a citizen of the United States, residing at Togo, in the county of Major, State of Oklahoma, have invented certain new and useful Improvements in Cotton-Pickers; and I do hereby declare the following to be a full, clear, and exact description of the invention, such as will enable others skilled in the art to which it appertains to make and use the same.

The invention relates to a cotton picker machine and more particularly to the class of machines adapted to be mounted upon a wagon and in which a suction current of air is created to remove from plants cotton and convey the same from a conduit or box to any desirable locality.

The primary object of the invention is the provision of a cotton picker machine comprising a main supporting frame having mounted thereon near one end an intake conduit or box, the same communicating with a suction fan, leading from the said conduit or box are a plurality of suction tubes having flared mouths to receive the cotton from the plants and to convey the same to said conduit or box, and motive means mounted upon the main frame and adapted to actuate the suction fan.

Another object of the invention is the provision of a cotton picker machine which shall possess superior advantages in point of simplicity and durability and which shall be thoroughly feasible, practical and efficient in operation.

With these and other objects in view the invention for example consists in the construction, combination and arrangement of parts as will be hereinafter more fully described and as illustrated in the accompanying drawings which disclose the preferred form of embodiment of the invention. However, it is to be understood that changes, variations and modifications may be resorted to without departing from the spirit of the invention, and such as come properly within the scope of the claim hereunto appended.

In the drawings: Figure 1 is a top plan view of a wagon with the invention mounted thereon. Fig. 2 is a front elevation. Fig. 3 is a longitudinal sectional view through the main frame, fan and intake conduit. Fig. 4 is a side elevation. Fig. 5 is a sectional view of the mouth of one of the suction tubes.

Similar reference characters indicate corresponding parts throughout the several views in the drawings.

In the drawings, the numeral 8 designates a wheeled wagon the same being of the ordinary construction and suitably mounted thereon is the main supporting frame 9 of the cotton picker machine and includes spaced longitudinal side beams 10, united at opposite ends by cross beams 11 to form the open frame structure. Near one end of the frame 9 is fixed vertical uprights or posts 12 the latter held rigid by brace bars 13 connected thereto and with the main frame. Mounted transversely of the main frame 9 and supported by the uprights 12 is an intake conduit or boxing 14 the opposite extremities of which project laterally a distance beyond opposite sides of the wagon. At intervals throughout the longitudinal extent of the conduit or boxing 14 and in communication therewith are a plurality of suction tubes or hose 15, each having mounted at its free end a picker head or shell 16 formed with a flared open mouth portion 17. In each of the picker heads 16 is a lever actuated spring controlled cut-off valve 18 which latter is adapted to regulate the supply of cotton gathered through said suction tube and conveyed to the intake conduit or boxing.

Centrally of the intake conduit or boxing 14 at one side thereof is a fan casing 19, the same having central side communication with the said intake conduit or boxing and working within the fan casing is a suction fan 20 the latter mounted upon a shaft 21 journaled in the fan casing and which shaft has fixed thereto exteriorly of the casing a beveled pinion 22 the latter enmesh with a beveled pinion 23 fixed to the inner end of a driven shaft 24 the latter supported in bearing brackets 25 projecting from and secured to the exterior face of one side of the fan casing.

Upon the main frame 9 is mounted a gasolene engine 26 the latter having a driving belt wheel 27 over which is trained an endless belt 28 the latter also trained over a belt wheel or pulley 29 fixed to the driven shaft 24 whereby rotary motion can be transmitted to the suction fan 20 from the driving engine.

Leading from the top of the fan casing 19 and projecting from its periphery is a discharge or delivery spout 30 which is adapted to deposit cotton into the wagon after the said cotton has been gathered or received in the intake conduit or boxing 14 when having been accumulated through the suction tubes leading to the said intake conduit or boxing.

In operation, the wagon is drawn along the row of cotton plants and presuming that the engine 26 has been started, the latter through its belt connection 28 will rotate the driven shaft 24 and through the medium of the enmeshing pinions 22 and 23 the shaft 21 will rotate to revolve the suction fan 20 and through its centrifugal action a suction will be created in the intake conduit or boxing and the suction tubes 15 which latter are so positioned to have their open flared mouths 17 come in close contact with the growing plants and the ripe cotton thereon which, if ready for picking easily loosened, will become readily detached by the suction set up by the fan 20 and will be conveyed through the tubes 15 into the intake conduit or boxing from thence to the fan casing where it will be forced by the revolving fan 20 through the delivery spout 30 into the wagon to be transported to any desirable locality.

What is claimed is—

In a cotton picker, a wagon body, uprights mounted thereon, a conduit mounted to extend horizontally across the upper ends of said uprights, said conduit being provided with a centrally disposed opening leading from one side thereof, a fan casing having a centrally disposed suction opening communicating directly with the centrally disposed opening in the conduit, said casing being mounted on the conduit so that said conduit extends diametrically thereacross, a fan in said casing, and means to actuate said fan.

In testimony whereof, I affix my signature, in presence of two witnesses.

HARRISON T. NOBLE.

Witnesses:
A. HESS,
J. W. SHOCKLEY.